United States Patent
Linde et al.

(10) Patent No.: US 11,541,981 B2
(45) Date of Patent: Jan. 3, 2023

(54) METHOD FOR INSTALLING SYSTEM COMPONENTS IN A PORTION OF AN AIRCRAFT FUSELAGE

(71) Applicant: Airbus Operations GmbH, Hamburg (DE)

(72) Inventors: Peter Linde, Hamburg (DE); Matthias Hegenbart, Hamburg (DE); Hermann Benthien, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 379 days.

(21) Appl. No.: 16/555,703

(22) Filed: Aug. 29, 2019

(65) Prior Publication Data
US 2020/0094937 A1  Mar. 26, 2020

(30) Foreign Application Priority Data

Sep. 25, 2018  (DE) .......................... 102018123531.3

(51) Int. Cl.
| | |
|---|---|
| *B64C 1/06* | (2006.01) |
| *B64C 1/26* | (2006.01) |
| *B64F 5/10* | (2017.01) |
| *B64C 1/18* | (2006.01) |

(52) U.S. Cl.
CPC ................ *B64C 1/069* (2013.01); *B64C 1/18* (2013.01); *B64C 1/26* (2013.01); *B64F 5/10* (2017.01); *B64C 2211/00* (2013.01)

(58) Field of Classification Search
CPC .. B64C 1/068; B64C 1/20; B64C 1/22; B64C 2211/00; B64C 1/26; B64F 5/10; B64D 9/00; B64D 9/003; B64D 2009/006; B60P 7/13; B60P 7/08; B60P 7/0807; B60P 7/0815
See application file for complete search history.

(56) References Cited

U.S. PATENT DOCUMENTS

| | | | |
|---|---|---|---|
| 9,169,016 B2 | 10/2015 | Goehlich et al. | |
| 2006/0231681 A1 | 10/2006 | Huber et al. | |
| 2007/0000739 A1 | 1/2007 | Lamarr | |
| 2008/0210820 A1* | 9/2008 | Kismarton | ................ B64F 5/10 244/120 |

(Continued)

FOREIGN PATENT DOCUMENTS

| | | |
|---|---|---|
| DE | 102006026168 A1 | 1/2008 |
| DE | 102009056593 A1 | 6/2011 |

(Continued)

*Primary Examiner* — Joshua J Michener
*Assistant Examiner* — Cindi M Curry
(74) *Attorney, Agent, or Firm* — Greer, Burns & Crain, Ltd.

(57) ABSTRACT

A method is proposed for installing system components in a portion of an aircraft fuselage. The method provides at least one planar structural arrangement to be secured on or in the aircraft fuselage, secures system components on the structural arrangement, couples system lines to the system components and arranges the system lines on the structural arrangement. The method includes positioning of the structural arrangement with the system components and system lines arranged thereon at a designated installation location of the structural arrangement, and mechanical coupling of the structural arrangement to the aircraft fuselage.

11 Claims, 7 Drawing Sheets

(56) References Cited

U.S. PATENT DOCUMENTS

| | | | |
|---|---|---|---|
| 2011/0001006 A1* | 1/2011 | Delahaye | B64F 5/10 244/118.5 |
| 2012/0187248 A1* | 7/2012 | Goehlich | B64F 5/50 244/137.1 |
| 2015/0083860 A1* | 3/2015 | Frauen | B64F 5/10 244/119 |

FOREIGN PATENT DOCUMENTS

| | | |
|---|---|---|
| DE | 102010055995 A1 | 6/2012 |
| DE | 102012001797 A1 | 8/2013 |
| DE | 102016210089 A1 | 12/2017 |

\* cited by examiner

METHOD FOR INSTALLING SYSTEM COMPONENTS IN A PORTION OF AN AIRCRAFT FUSELAGE

CROSS-REFERENCE TO PRIORITY APPLICATION

This application claims the benefit of, and priority to, German patent application number DE 102018123531.3, filed Sep. 25, 2018. The content of the referenced application is incorporated by reference herein.

TECHNICAL FIELD

Embodiments of the subject matter described herein relate generally to a method for installing system components in a portion of an aircraft fuselage. The disclosure further relates to an installation system for installing system components in an aircraft fuselage.

BACKGROUND

The installation of system components in an aircraft fuselage normally takes place following the manufacture of said aircraft fuselage. The individual system components are moved into the aircraft fuselage manually and secured at designated locations using tools and other resources. At some installation locations or portions of the aircraft fuselage, assembly can be hindered by confined installation space. It is known in the art, for example, for waste water tanks to be arranged in passenger aircraft in a tail portion of the fuselage and coupled to corresponding water, air and electrical lines. The size of the waste water tank and the comparatively low height of the installation space measuring less than 1.5 m mean that it is physically very difficult to carry out the assembly work. This furthermore results in an increase in assembly time, which can have a detrimental effect on other installation processes to be carried out in the aircraft fuselage.

BRIEF SUMMARY

A problem addressed by the disclosure is that of proposing a method for installing system components in an aircraft fuselage in which installation is made substantially easier and the assembly time is reduced.

The problem is solved by a method having the features of Claim 1. Advantageous embodiments and developments can be inferred from the dependent claims and the following description.

A method for installing system components in a portion of an aircraft fuselage is proposed, said method comprising the steps; provision of at least one planar structural arrangement to be secured on or in the aircraft fuselage, securing of system components on the structural arrangement, coupling of system lines to the system components and arrangement of the system lines on the structural arrangement, positioning of the structural arrangement with the system components and system lines arranged thereon at a designated installation location of the structural arrangement, and mechanical coupling of the structural arrangement to the aircraft fuselage.

Consequently, a planar structural arrangement is initially provided which is to be secured on or in an aircraft fuselage. The structural arrangement may be understood to be an arrangement made up of one or multiple structural components which together form part of a structure. The structure may, in principle, have several different characterizing features. In particular, the structure may form part of a primary or secondary structure arranged in the inside of the aircraft fuselage or be positioned on a structural portion lying outside the primary structure.

The structural arrangement could comprise cross members, for example, which are arranged parallel to one another along a longitudinal axis of the aircraft fuselage and carry floor supports or floor rails. On the other hand, the structural arrangement may also incorporate part of an outer skin or an outer fairing which is equipped, at least locally, with stiffening components. One example could be, for example, a fairing of a wing-fuselage joint which is also known by the term "belly fairing".

The aim is therefore to provide an inherently stable base for installation of system components outside the aircraft fuselage, so that the system components can be attached to said base. Installation does not require work in confined spaces and can be carried out substantially more ergonomically than with known methods, as the base is arranged for installation outside the aircraft fuselage.

The step involved in securing system components to the structural arrangement incorporates the positioning and securing of system components straight onto the structural arrangement. In aircraft known in the art, many systems are arranged on the primary structure, among other things, for example on frames and/or stringers. They are therefore attached in the interior to radially external regions. Depending on the design of the structural arrangement, however, a different construction may also result if the planar structural arrangement does not lie on or in the radially external primary structure.

The same applies to the coupling of system lines to the system components and the arrangement of the system lines on the structural arrangement. The system lines may be differently formed and are likewise connected to the structural arrangement. The structural arrangement with the system components and the system lines therefore forms a standalone unit with system components that can be operated on the structural arrangement as a module. This module can be positioned by positioning the structural arrangement with the system components and system lines arranged thereon at a designated installation location of the structural arrangement. As set out above, different installation locations can be considered.

The mechanical coupling of the structural arrangement to the aircraft fuselage is the final step of the single method step which must be carried out directly within the aircraft fuselage. The work to be accomplished by the assembly staff may, however, be substantially reduced compared with traditional methods. The mechanical coupling of the structural arrangement to the aircraft fuselage may, in particular, include the securing of dedicated support structures with application points of the aircraft structure. Profile carriers, bars or other means which have to be connected to the aircraft fuselage following the positioning of the structural arrangement may extend from said structural arrangement to which the system components are fastened. This may involve, in particular, the attachment to frames.

The coupling of the structural arrangement to the aircraft fuselage may take place by means of an automatic or automatable device.

The provision of the structural arrangement in an advantageous embodiment may involve the connection of multiple structural components into a coherent, compact, rigid structural arrangement. A structural arrangement of this kind is inherently stable, particularly in the non-installed state, and may provide a basis for the creation of a system made up of multiple system components. Multiple structural components may be assembled to form a planar structural arrangement which may contain all traditional connection methods and structural components. The structural components may comprise profile carriers or profile rails which are arranged in a particular grid layout and may be connected.

The at least one structural arrangement may comprise a floor structure for a cabin floor or a cargo hold floor. A structure of this kind is characterized by a series of cross members which are arranged parallel to one another and run between lateral, external sides of a rib in the installed state, for example. The spacing of the cross members relative to one another is therefore preferably determined by the spaces between consecutive ribs. In order to form a coherent structure, longitudinal members can be used which cover the cross members spaced apart from one another and connect them to one another. Consequently, the structural arrangement is formed as a base for a fully equipped module in the form of a partial floor piece. System components which are normally used on ribs or at least on an underside of a primary structure of the aircraft are arranged on an underside of a floor. Accordingly, it may be necessary for different holders to be used to fasten the system components than are currently customary in the prior art. The system lines may also extend along the structural arrangement rather than on an underside of the fuselage.

The securing of system components may, moreover, involve the fastening of the system components to an underside of the floor structure. This may involve the arrangement of holders which are attached to the system components so that they are then connected to the floor structure, or vice versa. The holders in this case must be adapted to the floor structure, in order to achieve a safe and reliable mounting.

The arrangement of the system lines on the structural arrangement involves the system lines being arranged on an underside of the floor structure. In this way, as previously stated, an independently operable module can be realized. The attachment to the underside of the floor structure further reduces the amount of direct work in the cramped installation space and also allows the system components to be tested outside the aircraft fuselage.

In a further embodiment, the at least one structural arrangement may have a fairing structure for a wing-fuselage joint. A fairing structure of this kind is arranged below a wingbox in the case of passenger aircraft and may cover a series of components which are installed there. The system components may, in particular, comprise hydraulic devices. The installation space available is also so limited there that there is no normal standing height and work is hindered in this region. The arrangement and securing of system components may therefore relate to system components being arranged directly on a fairing structure, so that the entire fairing structure is then arranged on the fuselage and secured.

Since the fairing structure usually closes off the aircraft fuselage downwardly, it is preferable for the system components to be arranged on the upper side of the fairing structure.

The positioning of the structural arrangement may involve the insertion of the structural arrangement into the aircraft fuselage on a carrier rail. The carrier rail may be of such a design that it is fastened to, or rests fixedly on, a floor of a workshop at least on one side, i.e. at one end. The opposite end may freely enter an opened fuselage section and be positioned in such a manner that the structural arrangement with the system components arranged thereon can be moved along the carrier rail to the designated installation location in the aircraft fuselage. As an alternative to this, the carrier rail may also extend right through the tail portion concerned and be secured at both ends. The carrier rail has a rail profile, at least locally, on which roller-mounted runners which carry the structural arrangement can be moved. In this way, large-sized construction sections can be introduced into the aircraft fuselage and secured there; a pre-existing floor or a similar, planar structure is not necessary for transportation and positioning.

The runners may be designed to keep the structural arrangement at a selectively adjustable distance. For example, each runner may have a cable pull by means of which the structural arrangement concerned can be lowered by gravity or can be raised by the active introduction of tensile force.

In a preferred embodiment, the mechanical coupling involves the connection of support structure members to the aircraft fuselage. The support structure members may be regarded as structural members that are secured to the planar structural arrangement and extend therefrom to the remaining part of the aircraft fuselage. In the example of the floor section, elongate support structure members may be arranged on an underside of the structural arrangement, said support structure members extending substantially perpendicularly thereto. The support structure members may be of such a size that they can be directly connected to ribs or other members on a radially external side of the interior of the aircraft fuselage. The coupling may, in addition, involve the compensating of dimensional tolerances at a connection point between the support structure members and the aircraft fuselage. Various methods could be considered for this purpose, involving the use of eccentric bushes and a suitable screw connection, for example. It should be particularly emphasized that all tolerance-compensating measures are carried out in order to attach the system components straight to the floor structure or the planar structural arrangement. Tolerance compensation is consequently shifted from the installation location on the aircraft fuselage into the planar structural arrangement and therefore takes place during assembly outside the aircraft fuselage.

The arrangement of system lines on the structural arrangement preferably involves the arrangement of system lines on the same side of the structural arrangement as the securing of system components. This means that, irrespective of the nature and design of the structural arrangement, it is guaranteed that through the structural arrangement provided with system components, a standalone self-contained module is formed.

The method may, in addition, involve the step of suspending the structural arrangement on an assembly frame and pivoting said structural arrangement on said assembly frame from an assembly position into an installation position. The assembly position can therefore be very ergonomically chosen. It is conceivable that a selective adjustment of the assembly position can take place, in order to allow the assembly position to be tracked in consecutive building steps.

The connection of the support structure members to the aircraft fuselage and the at least one structural arrangement preferably involves the compensation of production-related tolerances through the adjustment of connection positions. The connection positions may be set by adjustable screw connections, among other things, which use rotatable eccentric bushes. Other variants are not ruled out.

The disclosure further relates to a system module for integration in an aircraft fuselage, said system module comprising at least one system component, at least one system line and a planar structural arrangement in the form of a floor structure for a passenger cabin or a cargo hold or in the form of a fairing structure for a wing-fuselage joint, wherein the at least one system component and the at least one system line are fastened straight to the structural arrangement and form a coherent module which can be coupled to an aircraft fuselage to form a section of a floor arranged therein or a wing-fuselage joint. The system module is consequently a coherent unit made up of the structural arrangement and the system components which are coupled to the necessary system lines. Within the framework of the method illustrated above, the system module is therefore introduced into the aircraft fuselage.

The system components may exhibit at least one element from a group of system components, the group comprising:
  at least one waste water tank,
  at least one water tank,
  at least one fuel tank,
  at least one component of a hydraulic system,
  at least one electronic device,
  at least one receiving frame for electronic devices and
  at least one component of an air-conditioning system.

Still further system components are of course conceivable which, in particular, have to be integrated into confined spaces in the aircraft.

The disclosure could further relate to an installation system which has a selection of structural components for creating a structural arrangement, an assembly frame and a carrier rail with the runners represented above. In this way, a structural arrangement can be provided and fitted with system components, so that it can then be introduced into the aircraft fuselage.

The disclosure further relates to an aircraft which has an aircraft fuselage with a primary structure and at least one system module connected to the primary structure in a portion of the aircraft fuselage. The provision and installation in this case is carried out in the manner indicated above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible applications of the present disclosure result from the following description of the exemplary embodiments and the figures. In this case, all the features described and/or depicted form the subject matter of the disclosure individually and in any combination, irrespective of their composition in the individual claims or the appendancies thereof. Furthermore, the same reference numbers denote the same or similar objects in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

A number of steps involved in a method for installing system components 2 in a portion of an aircraft fuselage 4 are depicted in FIGS. 1a to 1d. In the figures which follow below, further steps are shown in addition.

Figure 1A:
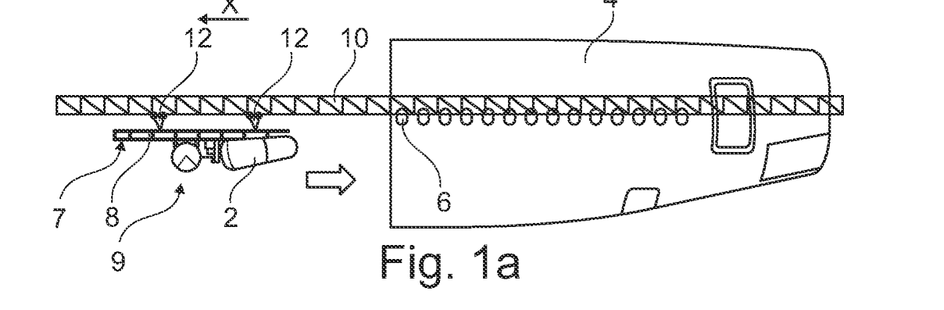
FIGS. 1a to 1d show some steps of a method for installing system components in a portion of an aircraft fuselage.

FIG. 1a shows a tail portion of the aircraft fuselage 4 which tapers in a longitudinal direction x. A series of window openings 6 is shown indicating the profile of a passenger cabin which must be fitted with a floor. The system components 2 are arranged below the floor where they are connected to the aircraft fuselage 4. Due to the designated position in a rearmost portion of the aircraft fuselage 4 and on account of the tapering, there is no standing space available for assembly personnel at this point below the floor and when customary assembly methods are used, assembly is made substantially more difficult from a physical point of view by the existing narrowness.

In order to make assembly easier, a planar structural arrangement 8 according to the disclosure is used which is configured as a floor structure in the present case. The system components 2 are arranged on an underside 7 of the structural arrangement 8 and are fixedly connected thereto by means of different holders which can be seen in the figures that follow below. In this way, a coherent system module 9 is created which can be coupled to the aircraft fuselage 4. The system module 9 shown furthermore creates a portion of a floor arranged in the aircraft fuselage 4.

A carrier rail 10 projects through the aircraft fuselage 4 and allows a displaceable bearing of runners 12. The runners 12 may comprise multiple rollers which can roll along a rail profile on the carrier rail 10. Through the arrangement of the carrier rail 10 shown through the aircraft fuselage, a displacement of the runners 12 along the longitudinal axis x can therefore be carried out. The structural arrangement 8 is arranged here and can be moved along the longitudinal axis.

Figure 1B:
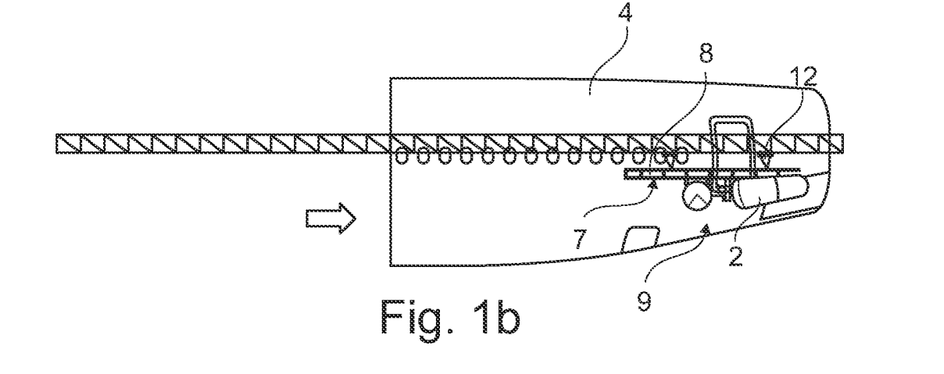

FIG. 1b shows that the structural arrangement 8 with the system components 2 arranged thereon is pushed along the carrier rail 10 into the aircraft fuselage 4 until a predetermined position is reached, at least along the longitudinal direction x of the aircraft fuselage 4. This may therefore correspond to the final position in the x-direction.

Figure 1C:
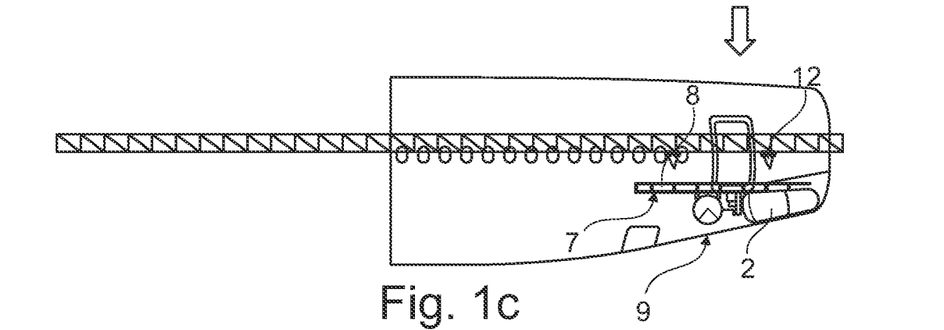
Figure 1D:
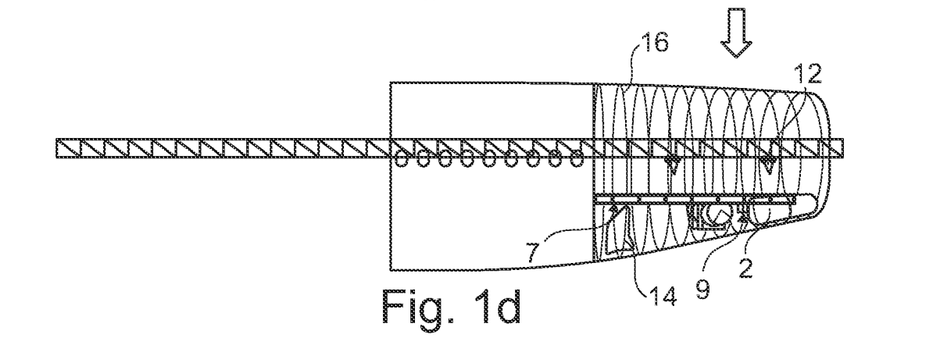

In FIG. 1c the structural arrangement 8 has been moved into a final position which, by way of example, is spaced apart in the vertical slightly further from the carrier rail 10. As shown in FIG. 1d, the support structure members 14 can be used to connect the structural arrangement 8 to the aircraft fuselage 4. The support structure members 14 are configured by way of example as bars or profile carriers which are particularly suitable for introducing the loads of a floor structure into a primary structure of the aircraft fuselage 4. The primary structure in this case may, in particular, comprise the fuselage frame 16 and also stringers which are not shown here and which run parallel to the longitudinal axis x. The support structure members 16 may also be configured, among other things, as hollow bars produced from a composite material which are fitted with articulated heads and are particularly lightweight.

Figure 2A:
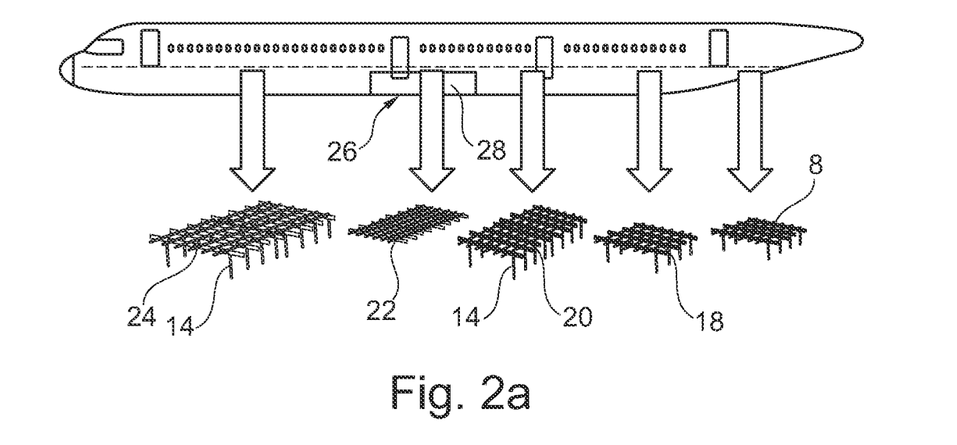
FIGS. 2a and 2b show the provision of a structural arrangement for arranging system components.

FIG. 2a shows by way of example multiple possible structural arrangements 8, 18, 20, 22 and 24 which would be suitable for the arrangement of system components 2. It goes without saying that this is not exhaustive and can be added to at random. While the structural arrangements 8, 18, 20 and 24 can each be fitted with support structure members 14, the structural arrangement 22 may belong to a fairing structure for a wing-fuselage joint 26 in the region of a wingbox 28.

Figure 2B:
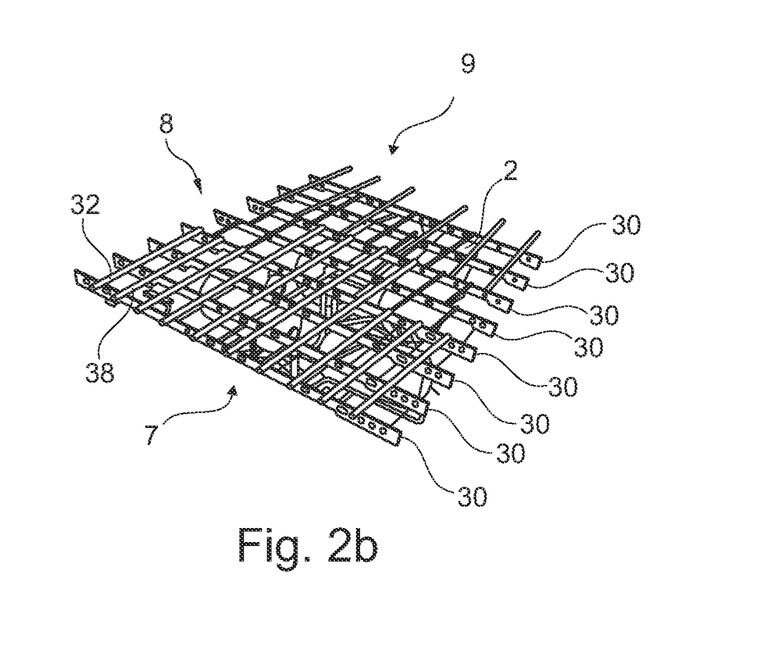

In FIG. 2b the structural arrangement 8 is shown as a slightly enlarged representation. It can be seen here that the structural arrangement 8 is made up of multiple cross members 30 arranged parallel to one another which are connected to one another with the help of longitudinal stiffening members 32 which may also comprise floor rails 38. The structural arrangement 8 is therefore rigid and inherently stable, so that it can be used as a base for arranging the system components 2. The method according to the disclosure may therefore involve the connection of multiple cross members 30 with the help of longitudinal stiffening members 32 in order to provide the planar structural arrangement.

Figure 3:
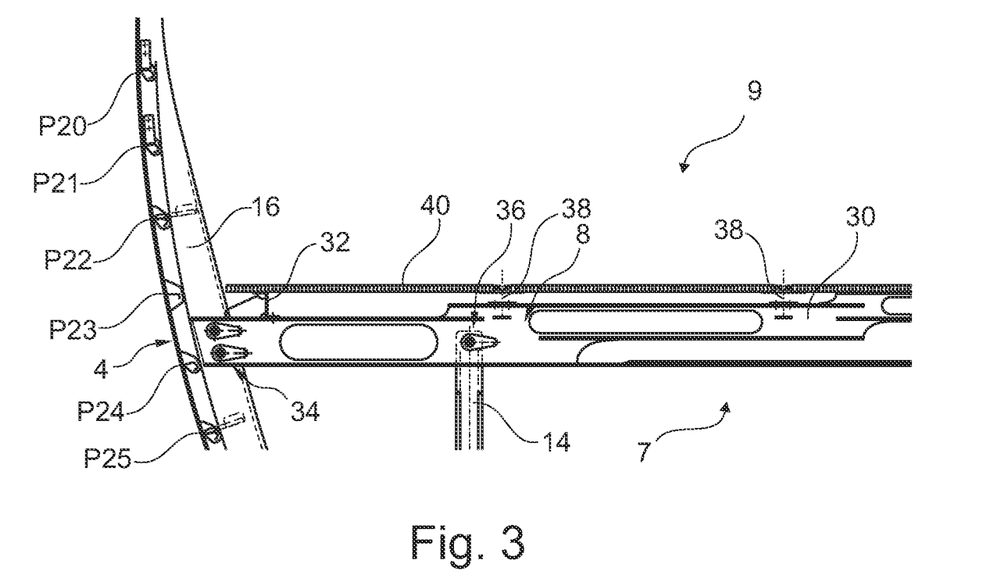
FIG. 3 shows an attachment of the structural arrangement in an aircraft fuselage.

As shown in FIG. 3, screw members 34 can be used to fasten the structural arrangement 8 or the system module 9 to the aircraft fuselage 4, for example to fuselage frames 16. These may exhibit tolerance-compensating properties. Likewise, the support structure members 14 may be coupled to the structural arrangement 8 via tolerance-compensating screw connections 36. The aim is to be able to compensate production-related tolerances in the aircraft fuselage 4 by means of screw connections 34 and 36 or other facilities during the attachment of the structural arrangement 8, while tolerances in relation to the installation of system components 2 are completely compensated within the structural arrangement 8. In FIG. 3, for example, the structural arrangement 8 or the system module 9 are shown in a front view in an installed state. In this case, a cross member 30 is shown which is fitted with floor rails 38 and other longitudinal stiffening members 32. Floor panels 40 are arranged on these stiffening members, said floor panels forming a floor following installation of the structural arrangement 8.

Figure 4A:
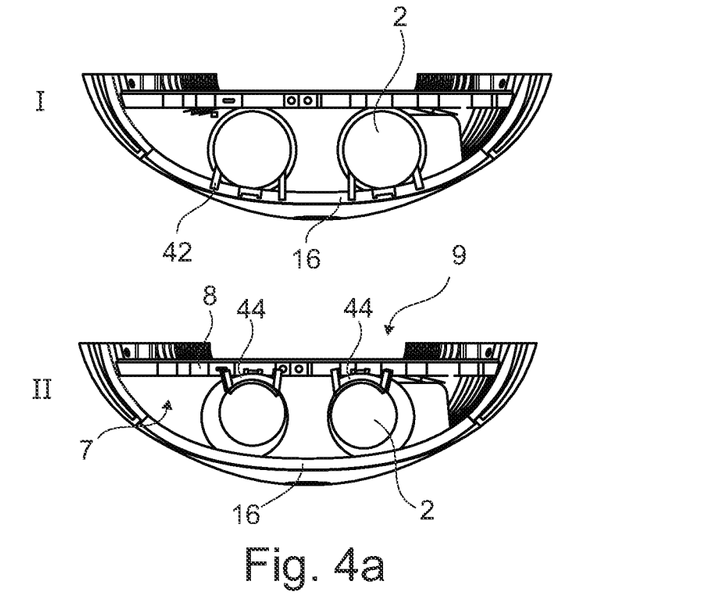
FIGS. 4a to 4c show by way of example a structural arrangement in the form of a floor section with system components arranged thereon.

FIG. 4a shows a comparison between the installation of system components 2 in the prior art (I) and with the help of the method (II). In the upper depiction I all system components 2 have mechanical holders 42 which are connected to fuselage frames 16. All system components are consequently to be introduced into the aircraft fuselage 4 and, in particular, arranged lying on fuselage frames 16 and then connected to system lines.

In the case of the example shown above with a floor structure as the structural arrangement 8 for forming a system module 9, however, modified holders 44 are required with which the system components 2 are to be connected to the structural arrangement 8. Consequently, a basic spatial design of the system components 2 can be adopted, however all holders 44 are designed for fastening to the underside 7 of the structural arrangement 8 in the form of a floor structure. It is no longer necessary, however, for production-related tolerances of fuselage frames 16 with holders to be compensated, as the structural arrangement 8 with system components 2 arranged thereon is inserted into the aircraft fuselage 4 as a complete, finished system module 9 and has to be connected to the fuselage frames 16 as a whole via tolerance-compensating measures.

Figure 4B:
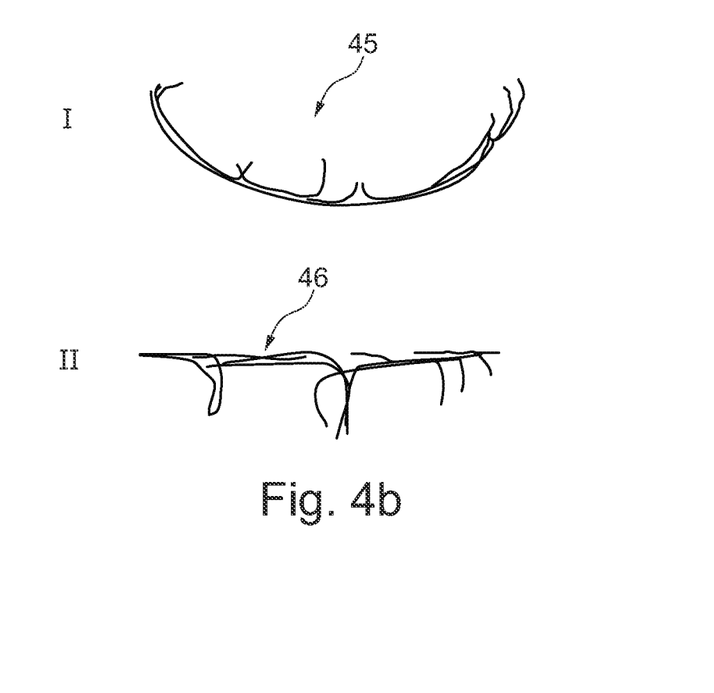

The same applies to the depictions in FIG. 4b. Here, an arrangement of system lines 45 in the prior art (I) is shown which, in a large part, extend along the fuselage frames 16. In the depiction (II) shown below, system lines 46 are distributed in a spatially different manner. They extend in large measure via the structural arrangement 8 and run from there to the system components 2.

Figure 4C:
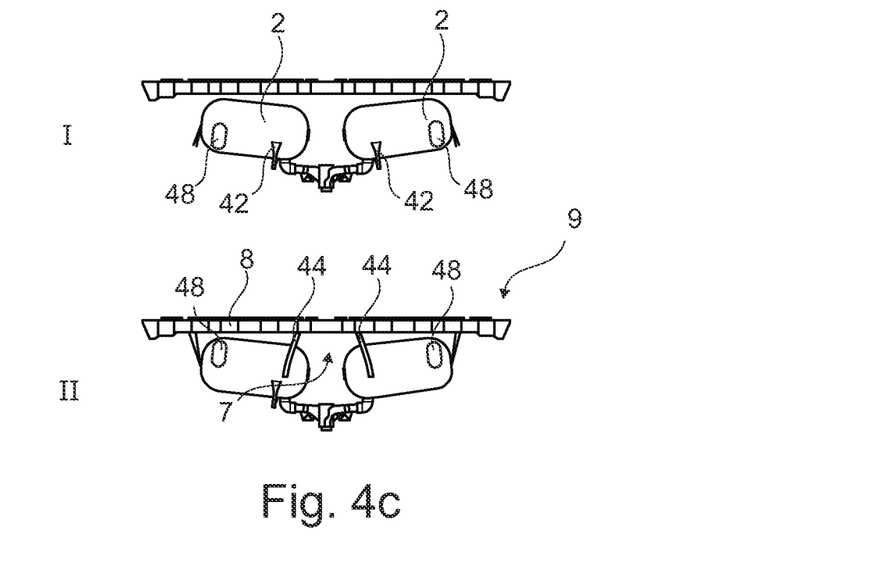

FIG. 4c shows by way of example waste water tanks as system components 2 which are connected to different system lines. Here, too, a widespread arrangement of holders 42 is shown in an upper depiction (I), while the arrangement of holders 44 according to the embodiment (II) is depicted in a similar manner to FIG. 4a. While the position of the waste water tank 2 remains practically unchanged, it may be expedient for individual peripheral devices such as pumps 48 and the like, for example, to be moved. In representation II, the pumps 48 are placed directly on the structural arrangement 8, for example, and are connected to the waste water tanks 2.

Figure 5:
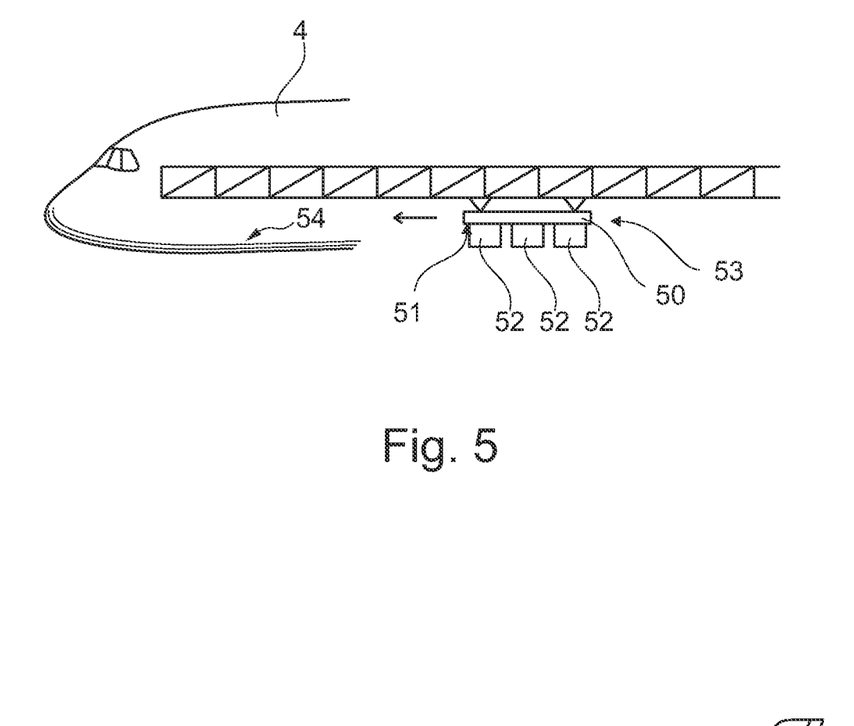
FIG. 5 shows a further example of a structural arrangement in the form of a floor section for integration in a front portion of an aircraft fuselage.

FIG. 5 shows a different variant in which a structural arrangement 50 on an underside 51 is equipped with avionics devices 52 as system components and introduced as a system module 53 into a front portion of the aircraft fuselage 4. In the avionics compartment 54 there is a relatively small installation space for accommodating assembly personnel and assembly can be made substantially easier using the method steps according to the disclosure.

Figure 6:
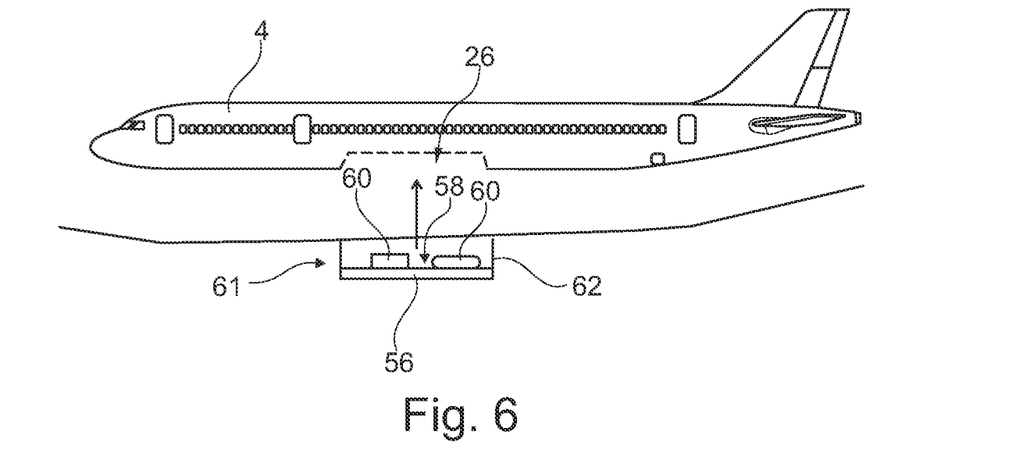
FIG. 6 shows an example of a structural arrangement in the form of a fairing portion for a wing-fuselage joint.

FIG. 6 shows very schematically a structural arrangement 56 which can be used for a wing-fuselage joint 26. The structural arrangement 56 supports multiple system components 60 on its upper side 58 which are fixedly connected to the structural arrangement 56 on its upper side. Support structure members 62 which are depicted only for the sake of completeness and in highly schematic form are used to fasten a resulting system module 61. In this way, the structural arrangement 56 can be secured to the remaining aircraft fuselage 4 once it has been placed in the desired position.

Figure 7:
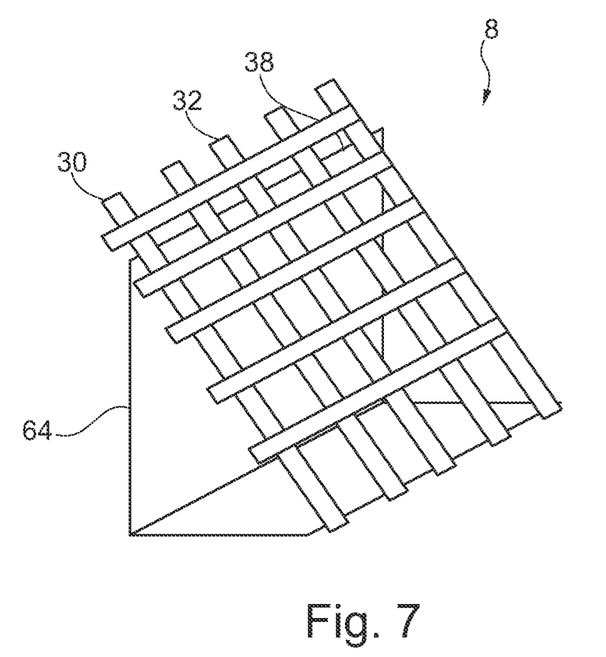
FIG. 7 shows schematically an assembly frame for providing a structural arrangement and the installation of system components.

FIG. 7 shows very schematically an assembly frame 64 which is capable of supporting the structural arrangement 8 (or a different one) and pivoting it from an assembly position into an installation position. The assembly position may be adopted, for example, in order to provide the structural arrangement 8 itself and thereby connect the cross members 30 to the longitudinal stiffening members 32 and the floor rails 38. The installation position may deviate from this and serves to support the installation of system components 2 in order to form the system module 9. Depending on the size of the structural arrangement and progress of the installation, the installation position can be adapted as required.

Figure 8:
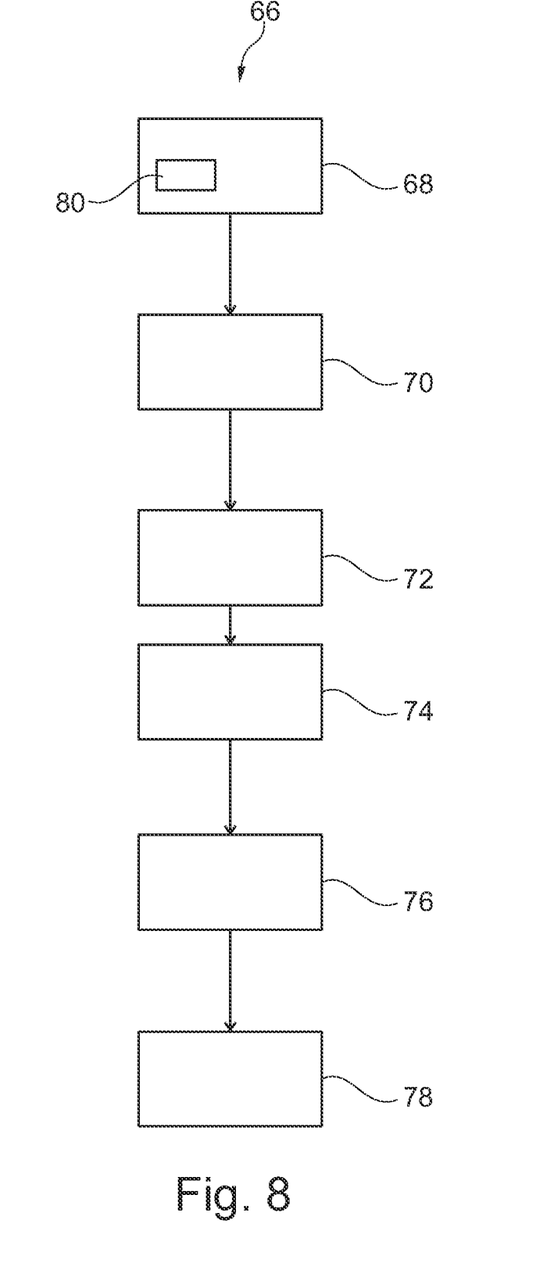
FIG. 8 shows a method for installing system components in a schematic, block-based representation.

FIG. 8 shows a schematically depicted method 66 for installing system components in a portion of an aircraft fuselage. By way of example, the method involves the steps of; providing 68 at least one planar structural arrangement to be secured on or in the aircraft fuselage, the securing 70 of system components on the structural arrangement, the coupling 72 of system lines to the system components and the arrangement 74 of the system lines on the structural arrangement, the positioning 76 of the structural arrangement with the system components arranged thereon and system lines at a designated installation location of the structural arrangement, and the mechanical coupling 78 of the structural arrangement to the aircraft fuselage. The provision of the structural arrangement may involve the connection 80 of multiple structural components to form a coherent, rigid structural arrangement.

Figure 9:
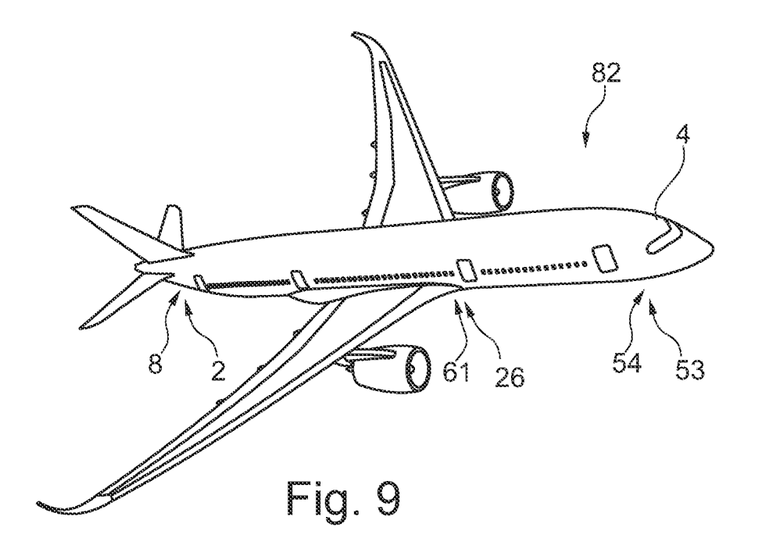
FIG. 9 finally shows an aircraft with an aircraft fuselage and a portion in which a structural arrangement with system components installed is arranged.

Finally, FIG. 9 shows an aircraft 82 with an aircraft fuselage 4 which, by way of example, exhibits a system module 9 in a rear region. The installation of the system components 2 in this case is carried out as described above. The system module 61 may also be arranged in the wing-fuselage joint 26. The system module 53 may be found in the avionics compartment 54.

In addition, it should be pointed out that "comprising" does not preclude other elements or steps and "a" or "an" does not preclude a plurality. It should further be pointed out that features which have been described with reference to one of the above exemplary embodiments can also be used in combination with other features of other exemplary embodiments described above. Reference numbers in the claims should not be regarded as limiting.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for installing system components in a portion of an aircraft fuselage, the method comprising the steps of:
    provision of at least one planar structural arrangement to be secured on or in the aircraft fuselage;
    provision of at least one structural member, a first end of which is attached to the at least one planar structural arrangement;
    securing of system components on the at least one planar structural arrangement;
    coupling of system lines to the system components and arrangement of the system lines on the at least one planar structural arrangement;
    positioning of the at least one planar structural arrangement with the system components and system lines arranged thereon and the at least one structural member attached thereto at a designated installation location of the at least one planar structural arrangement; and
    after the step of positioning of the at least one planar structural arrangement, mechanical coupling of the at least one planar structural arrangement and a second end of the at least one structural member to the aircraft fuselage,
    wherein attachment of the first end of the at least one structural member to the at least one planar structural arrangement is located at a point spaced from a lateral end of the at least one planar structural arrangement.

2. The method according to claim 1, wherein the provision of the at least one planar structural arrangement involves the connection of multiple structural components into a coherent, rigid structural arrangement.

3. The method according to claim 1, wherein the at least one planar structural arrangement comprises a floor structure for a cabin floor or a cargo hold floor.

4. The method according to claim 3, wherein the securing of system components involves the fastening of the system components to an underside of the floor structure.

5. The method according to claim 3, wherein the arrangement of the system lines on the at least one planar structural arrangement involves the system lines being arranged on an underside of the floor structure.

6. The method according to claim 1, wherein the positioning of the at least one planar structural arrangement involves the insertion of the structural arrangement into the aircraft fuselage on a carrier rail.

7. The method according to claim 1, wherein the mechanical coupling involves the connection of support structure members to the aircraft fuselage and the at least one planar structural arrangement.

8. The method according to claim 1, wherein the arrangement of system lines on the at least one planar structural arrangement involves the arrangement of system lines on the same side of the at least one planar structural arrangement as the securing of the system components.

9. The method according to claim 1, wherein the method further involves the step of suspending the at least one planar structural arrangement on an assembly frame and the pivoting of the at least one planar structural arrangement on the assembly frame from an assembly position into an installation position.

10. The method according to claim 7, wherein the connection of the support structure members to the aircraft fuselage and the at least one planar structural arrangement involves the compensation of production-related tolerances through the adjustment of connection positions.

11. The method according to claim 1, further comprising at least one tolerance-compensating screw connection coupling the at least one planar structural arrangement to the aircraft fuselage, wherein the at least one tolerance-compensating screw connection compensates for production-related tolerances in the aircraft fuselage.

* * * * *